W. F. CREMEAN.
RAILWAY CAR.
APPLICATION FILED MAR. 9, 1922.
Reissued May 23, 1922.
15,360.
2 SHEETS—SHEET 1.
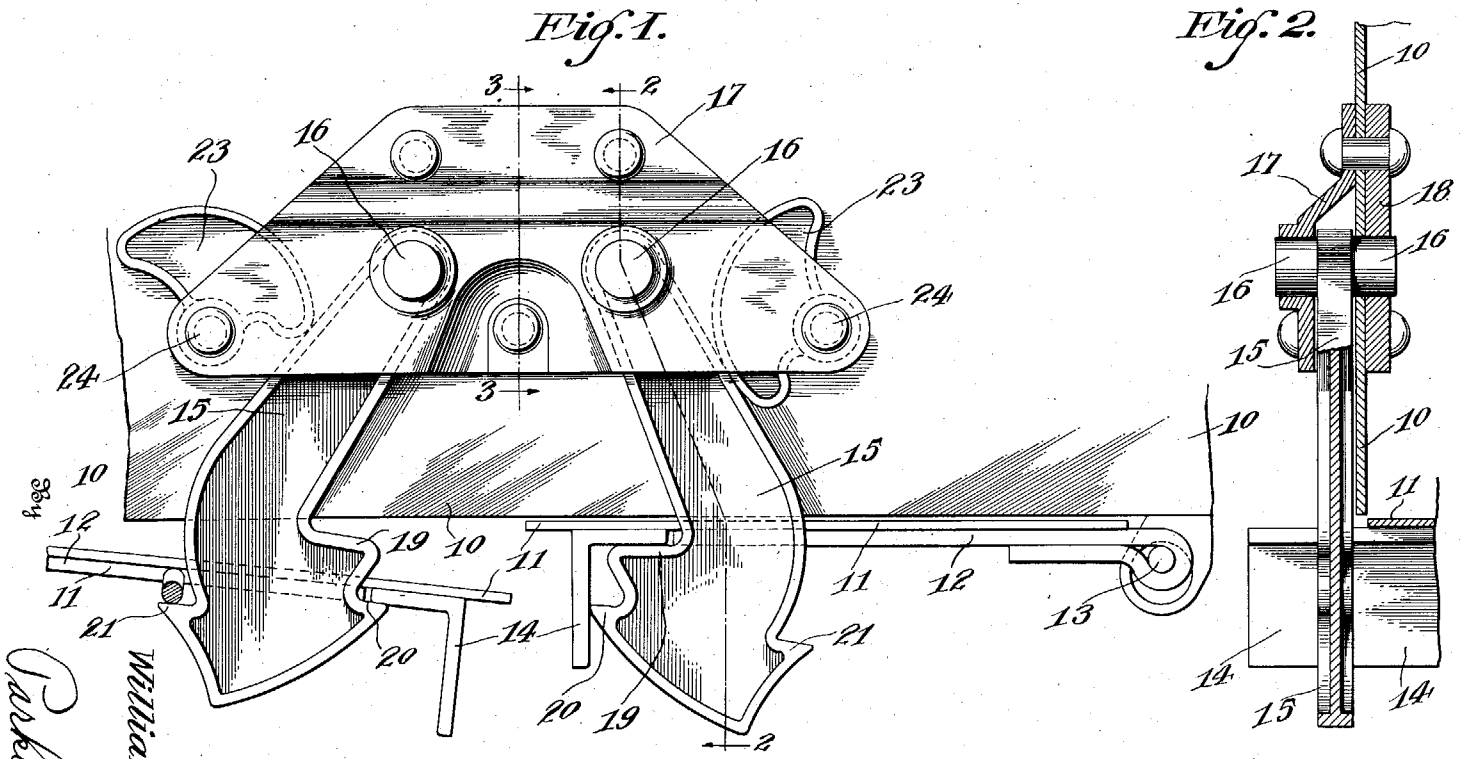
Inventor
William F. Cremean
By Parker Cook
Attorney

W. F. CREMEAN.

RAILWAY CAR.

APPLICATION FILED MAR. 9, 1922.

Reissued May 23, 1922. 15,360.

2 SHEETS—SHEET 2.

Inventor

William F. Cremean

By Parker Cook

Attorney

UNITED STATES PATENT OFFICE.

WILLIAM F. CREMEAN, OF TOLEDO, OHIO, ASSIGNOR TO THE WINE RAILWAY APPLIANCE COMPANY, A CORPORATION OF OHIO.

RAILWAY CAR.

15,360. Specification of Reissued Letters Patent. Reissued May 23, 1922.

Original No. 1,336,134, dated April 6, 1920, Serial No. 294,369, filed May 3, 1919. Application for reissue filed March 9, 1922. Serial No. 542,494.

*To all whom it may concern:*

Be it known that WILLIAM F. CREMEAN, a citizen of the United States of America, residing at Toledo, in the county of Lucas and State of Ohio, has invented certain new and useful Improvements in Railway Cars, of which the following is a specification.

My invention relates to new and useful improvements in car door supporting and locking devices and more particularly to an improved supporting and locking device which is to be used on railway cars having drop bottom doors or hopper type of cars having the swinging hopper doors.

In a number of supporting and locking devices as now used in conjunction with freight cars having drop bottom doors or on hopper cars having swinging hopper doors, it is difficult to completely close the doors due to the warping or distortion of the doors from the rough usage to which they are incident or due to the fact that some of the material loaded in the cars will fill in along the hinged edge of the doors. Furthermore, although it is a relatively easy matter to bring the door to a nearly closed position, much greater force is found necessary to force the door to its final or closed position where the same may be secured by a locking device.

The main object, therefore, of the present invention is to provide a drop bottom or swinging door supporting and locking device which will first support the door in a partly closed position from which temporary position it may be lifted or forced into its final position and then locked.

Still another object of the present invention is to provide a supporting and locking device comprising a properly pivoted hook which is designed to engage the door through the medium of a ledge or bracket formed on the door, the hook being provided with a main supporting ledge and an auxiliary supporting ledge, so that the door may be first temporarily supported in a partly closed position from which position the door may be forced to the main supporting ledge of the hook, after which the hook may be quickly locked in engagement with the bracket or ledge formed on the door.

Still another object of my invention is to provide a car door securing and locking device wherein a hook is to be pivoted to the side of the car body or pivoted to a bracket which may be secured to the car body, and to provide the hook with means for first supporting the door in a temporary position and to also provide a fulcrum means so that the door may be forced from its temporary supported position to a final supported position, after which the hook may be locked in engagement with the door, thus supporting and locking the door in its final tightly closed position.

Still another object of the invention is to provide a car door locking device wherein a hook is provided for engaging a ledge secured to the door and to provide a fulcrum means associated with the hook so that the door may be forced to a tightly closed position so that the jaw of the hook may be forced thereunder after which the hook may be locked in engagement with the said door.

With these and numerous other objects in view, the invention consists in certain new and novel constructions and combination of parts as will be hereinafter more fully described and pointed out in the claims.

In the drawings in which similar reference characters indicate the same parts in the several figures, and which drawings show a preferred embodiment and one modification, Fig. 1 is a side elevational view of one form of the car door securing and locking device and showing a fragmentary portion of a car and a drop bottom door.

Fig. 2 is a sectional view taken on line 2—2 of Fig. 1.

Figure 3:
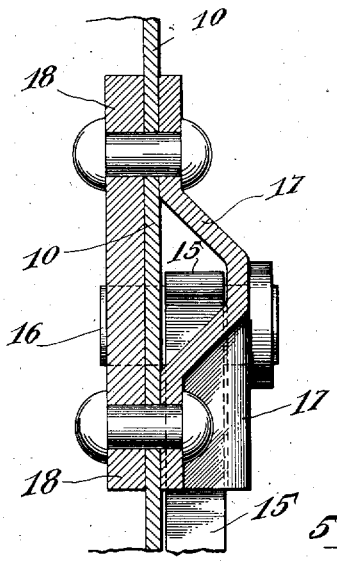
Fig. 3 is a vertical sectional view taken on line 3—3 of Fig. 1.
Figure 5:
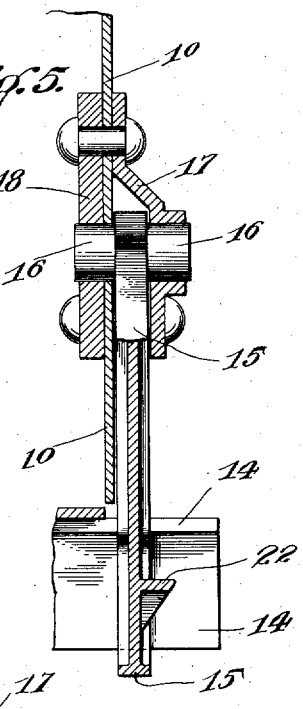
Fig. 5 is a sectional view taken on line V—V of Fig. 4.

At the outset, it might be stated that although I have shown in the drawings a fragmentary portion of a side of a car and drop bottom doors, the invention might equally as well be used with other forms or types of cars having different styles of drop bottom doors or with hopper doors which may or may not be inclined with relation of the car body.

In the drawings and referring at the outset to Figs. 1 and 2, a fragmentary portion of a car side 10 is shown together with a pair of transversely disposed hinged doors 11, the doors having their free edges adjacent and supported by the hinge bars 12 mounted on the transversely disposed pintles 13, the doors being adapted to swing toward each other into their closed position.

Preferably secured to the bottom of each of the doors and near their other edge is the transversely extending angle iron 14 which extends outwardly a short distance beyond the free side of the car body so as to provide a convenient ledge to be engaged by the door hook 15, shortly to be referred to.

It will be understood that by mounting the angle irons 14, as heretofore referred to, not only are ledges formed to be engaged by the hooks but the entire door will be strengthened. However, it is not absolutely necessary that angle irons be used nor is it necessary that they extend completely across the bottom of the door and out beyond the free sides as brackets might be used which may be suitably secured to the doors so that they extend out beyond the free edges of the door, but not extend completely across the bottom of the door.

In other words, members of any desirable form may be secured to the door to form ledges that will cooperate with the hook.

In the drawings I have shown two hooks and it might be here mentioned that the two will be used where two doors have their inner ends adjacent, but one hook may be used, of course, equally as well if only one door is to be supported. Furthermore, although only one side of a door and a car are shown in the drawings, in most instances the doors will be similarly supported on their opposite sides.

Also, in the present embodiment, I have shown the hooks 15 as being each provided with an integral pivot lug 16, journaled in inner and outer brackets 17 and 18, which brackets are riveted to the car sides 10. These hooks for each pair of doors are turned to swing parallel with the sides of the car towards the free edges of the doors, and in opposite directions and are adapted to engage the angle irons 14 of the doors, the hooks being properly pivoted with respect to their centers of gravity so that they will normally hang in their engaged positions.

It might be here mentioned that the inner and outer brackets 17 and 18 form a desirable means of securing the hooks to the side of the car body.

Each hook, near its lower extremity, is provided with a main locking face or supporting ledge 19, and an auxiliary supporting face 20, the latter being slightly below the former. In the present instance I have shown both the supporting faces of the hook shaped to conform to the flat leg or locking face of the projecting angle iron 14. However, it is to be understood that each will conform to the shape of whatever form of ledge is secured to the bottom of the door.

In some instances I have found that it is an advantage to provide a lug or projecting portion 21 on the lower rear edge of the hook to serve as a bearing or fulcrum for lifting the door from a temporary supported position, that is, when resting on the auxiliary ledge 20, to the main supporting ledge 19, and I have therefore shown this lug or projection 21 in the drawings, (see Fig. 1.) However, it is to be clearly and unequivocally understood, that it is not absolutely necessary to provide this lug and in a number of instances may be entirely omitted.

Figure 4:
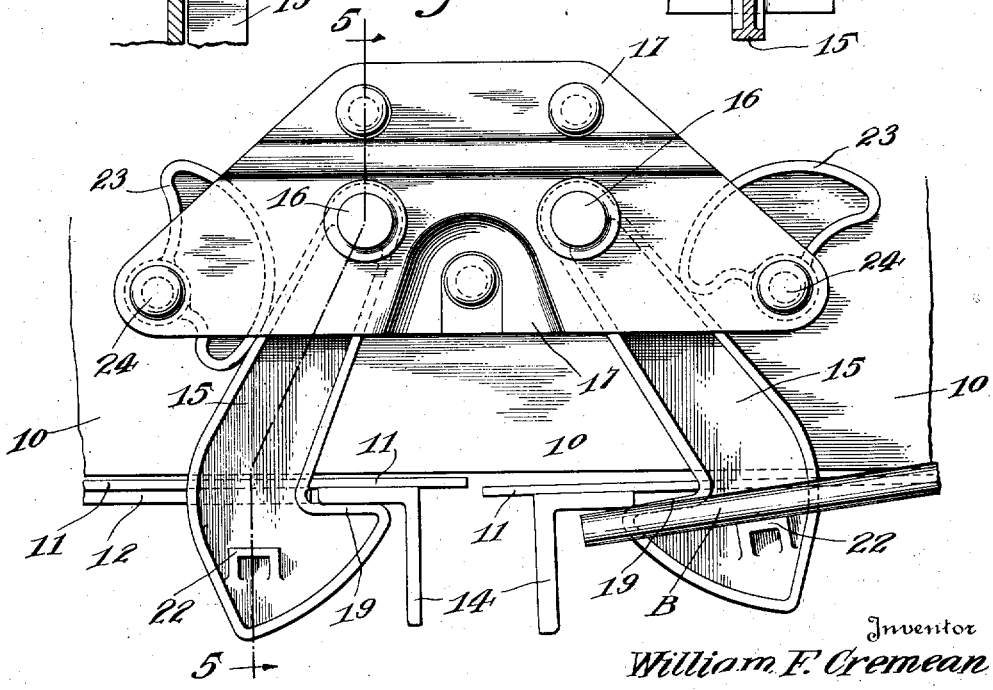
Fig. 4 is a side elevational view of a modified form of the car door locking device, a fragmentary portion of the side of the car and two doors being shown.

In the modification, shown in Fig. 4, a lug or projection is provided on the outer side of the hook as it is indicated by the numeral 22, and the auxiliary ledge 21 is not shown as incorporated. In this instance, also, the lug 22 may or may not be provided or a main supporting ledge may be formed on the hook, and with or without the addition of the lug 22.

In other words, the gist of the invention is to provide a hook having a main and auxiliary supporting ledge, so that the door may be first supported in a temporary position, after which it may be raised to a final position either by lifting or by forcing the same. A fulcrum point formed on the hook for forcing the doors from a temporary to a final position, may or may not be incorporated on the hook as desired.

Referring further to Fig. 1, a dog 23 is shown pivoted in the bracket and to the car side by the bolt 24, one being shown for each hook for the purpose of firmly and securely locking the hooks and likewise the doors in their closed position to thereby provide against disengagement of the hooks from the ledges formed on the doors thus securely retaining the doors in their supported and locked position and against accidental opening in transit.

The operation of the locking device is exceedingly simple as the door will be first raised by hand so that it will be engaged and held by the auxiliary supporting face or ledge 20 of the hook, and from this position it may be lifted or forced to its final position on the main supporting ledge 19. This may be done in a number of ways and if the hook is provided with a rear projection 21, the bar B may be laid thereon, and the door pried or forced upwardly until it rests on the main locking face after which the hook will be forced forwardly as shown on the right side of Fig. 1, after which the dog will be swung to its locking position.

In the modified form as shown in Fig. 4, if the hook is provided with a lug 22, the bar B may be used to raise the door and if the hook should be made with two ledges thereon, it will first be raised to a temporary supported position, after which the bar B will be fulcrumed on the lug 22 to raise the door to its closed position.

From the foregoing it will be seen that I have provided a car door supporting and locking device consisting primarily of a hook which is to be provided with a main and an auxiliary locking ledge so that the door may be first raised to a temporary supported position, after which it may be raised to the main supporting ledge which will then support it in its closed or final position, after which the dog will be swung so that any accidental disengagement of the hook from the door will be impossible. Furthermore, a fulcrum means may be provided on the hook.

It will also be seen that the locking device is exceedingly simple in construction and provides means for supporting the doors in a temporary position, after which they may be conveniently forced or pried to a final position which is of great advantage as much greater force is often necessary to finally close the doors as compared to the force for lifting the doors to a partly closed position.

Many slight changes might be made in regard to the bracket, to the shape of the jaws and the supporting ledges formed on the doors without in any way departing from the spirit and scope of the invention.

Having thus described my invention what I claim as new and desire to secure by Letters Patent is:

1. A drop bottom car door supporting device, comprising a pivoted hook, said hook provided with an auxiliary ledge for supporting the door in a temporary partly closed position and said hook further provided with a main supporting ledge for holding the door in its final closed position.

2. A drop bottom car door supporting and locking device comprising a pivoted hook, said hook provided with an auxiliary ledge for supporting the door in a temporary partly closed position, and said hook further provided with a main supporting ledge for supporting the door in its final closed position, and means for locking the hook in its final supporting relation with said door.

3. A door supporting and locking device for freight cars having swinging doors comprising a hook, said hook having an auxiliary ledge for supporting the door in a temporary partly closed position, a main supporting ledge located above said auxiliary supporting ledge, and means for locking the hook against movement with relation to said door when said door is supported on the main supporting ledge.

4. In combination with a freight car having a drop door, a member secured to the bottom of the door and extending beyond a free edge thereof, a pivotal hook secured to the car body and above the member secured to the car door, an auxiliary ledge formed on said hook to engage the member on said door to support the door in a temporary partly closed position and a main supporting ledge for engaging the member formed on said door when said door is lifted and thereby hold said door in its final closed position.

5. In combination with a freight car having a drop door, a member secured to the bottom of the door and extending beyond a free edge thereof, a pivotal hook secured to the car body and above the member secured to the car door, an auxiliary ledge formed on said hook to engage the member on said door to support the door in a temporary partly closed position, a main supporting ledge for finally engaging the member formed on said door to tightly hold said door in its closed position, and means for locking the hook in engagement with said member secured to the car door.

6. In combination with a freight car having a swinging door, a member secured to the bottom of the door and extending beyond a free edge thereof, a pivotal hook secured to the car body and above the member secured to the car door, an auxiliary ledge formed on said hook to engage the member on said door to support the door in a temporary partly closed position, a main supporting ledge for engaging the member formed on said door to support the door in its final closed position, and the contour of the face of the main supporting ledge corresponding with the contour of the face of the member secured to the car door.

7. In combination with a freight car having a drop bottom door, a member secured to the door and extending beyond a free edge thereof to form a ledge, a bracket secured to the car body, a pivotal hook secured in said bracket and located above the member secured to the car door, an auxiliary ledge formed on said hook to engage the ledge on the car door to support the door in a temporary partly closed position, a main supporting ledge on said hook for finally engaging the ledge on said door to thereby hold the door in its closed position, and means for locking the hook in engagement with the ledge formed on said door.

8. In combination with a freight car having drop bottom doors, said doors being each provided with an angle extending beyond a free edge of said doors, a bracket secured to the car body above the inner adjacent ends of the doors, pivotal hooks secured in said brackets and said hooks being each provided with an auxiliary supporting ledge to temporarily engage respectively the angles secured to the said doors, said hooks provided with main supporting ledges for finally engaging the angles on said doors to hold said doors in their closed positions and means for locking the hooks in engagement with the angles on said doors.

9. A drop bottom car door securing devices comprising a pivoted door engaging hook provided with a door engaging ledge, an auxiliary supporting ledge formed on said hook, and means formed on said hook to serve as a support for means for raising the door from support on the auxiliary ledge to the main supporting ledge.

10. In combination with a freight car having drop bottom doors, securing devices for said doors comprising pivotal engaging hooks each provided with a main and an auxiliary supporting ledge and fulcrum points formed on said hooks and adapted to serve as a support for door raising means so as the doors may be lifted from the temporary supporting ledges to the main supporting ledges.

11. In combination with a freight car having a drop bottom door, a securing device comprising a hook having a door engaging means and said hook also provided with a projecting portion so constructed and arranged as to be adapted to receive a movable door raising means and serve as a fulcrum therefor.

12. In combination with a freight car having a swinging door, a hook having an auxiliary and a main supporting ledge, and a projecting portion constructed and arranged on said hook to receive a movable door raising means to serve as a fulcrum therefor.

13. In combination with a railway car having a movable door, a hook pivoted to the car and adapted to engage said door and to hold the same in closed position, a cam also pivoted to the car and adapted to hold the said hook in engaged relationship with the door, the said hook being provided with an auxiliary ledge and a projecting portion by means of which the door may be raised from a partly closed to a fully closed position.

14. In combination with a railway car having a body and movable door, an outer bracket attached to and spaced from the outer side of the body, a hook having integral and oppositely disposed pivot lugs journaled in said outer bracket and car body, and adapted to engage said door and hold the same in closed position.

15. In combination with a railway car, a movable door, an outer bracket adapted to space from the side of the body, a hook having integral and oppositely disposed pivotal lugs journaled in said outer bracket and car body and said hook provided with a main and auxiliary supporting ledge and adapted to engage said door first on said auxiliary ledge and then engage said door with said main supporting ledge and hold the same in closed position.

16. In combination with a railway car having a body and movable door, an outer bracket attached to and spaced from the outer side of the body, an inner bracket attached to the inner side of the body, a hook having integral and oppositely disposed pivot lugs journaled in said outer and inner brackets, and adapted to engage said door and hold the same in closed position.

17. In combination with a freight car having a drop door, an outer bracket attached to and spaced from the outer side of the door, an inner bracket attached to the inner side of the body, a hook having integral and oppositely disposed pivot lugs journaled in said brackets, a main and an auxiliary supporting ledge formed on said hook to first support the door in a temporary position and then support the door in a final position, and means formed on said hook to form a fulcrum point for a movable raising means to lift the door from its temporary to its final supported position.

18. The combination of a drop bottom car door, a door engaging hook and raising means comprising a series of supporting ledges, a fulcrum adapted to support means to operate said door from one position to another.

19. A combination of a drop bottom car door, a door engaging hook and raising means comprising an auxiliary ledge for supporting the door in a temporary partly closed position and a main supporting ledge for supporting the door in a final closed position and a fulcrum adapted to receive means to operate said doors from one ledge to the other.

In testimony whereof I affix my signature.

WILLIAM F. CREMEAN.